United States Patent
Sato et al.

(10) Patent No.: US 9,168,660 B2
(45) Date of Patent: Oct. 27, 2015

(54) SCARA ROBOT

(71) Applicant: Seiko Epson Corporation, Tokyo (JP)

(72) Inventors: Yuta Sato, Azumino (JP); Shingo Hoshino, Hokuto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/512,734

(22) Filed: Oct. 13, 2014

(65) Prior Publication Data

US 2015/0114160 A1  Apr. 30, 2015

(30) Foreign Application Priority Data

Oct. 28, 2013  (JP) ................. 2013-223013

(51) Int. Cl.
| | | |
|---|---|---|
| B25J 17/00 | (2006.01) | |
| B25J 18/00 | (2006.01) | |
| B25J 18/02 | (2006.01) | |
| B25J 19/00 | (2006.01) | |
| B25J 9/10 | (2006.01) | |
| B25J 9/04 | (2006.01) | |

(52) U.S. Cl.
CPC ............. B25J 19/0004 (2013.01); B25J 9/101 (2013.01); B25J 9/042 (2013.01); Y10S 901/11 (2013.01); Y10S 901/27 (2013.01)

(58) Field of Classification Search
CPC ........... B25J 9/0015; B25J 9/042; B25J 9/101
USPC ........................................ 74/490.01; 901/49
See application file for complete search history.

(56) References Cited

U.S. PATENT DOCUMENTS

| | | | |
|---|---|---|---|
| 3,717,231 A * | 2/1973 | Kaufeldt ................ | 192/139 |
| 5,515,599 A * | 5/1996 | Best ...................... | 29/705 |
| 2005/0087034 A1 * | 4/2005 | Friedrich et al. ......... | 74/490.03 |
| 2010/0050806 A1 * | 3/2010 | Ono et al. ............... | 74/490.02 |
| 2014/0109712 A1 | 4/2014 | Ono | |

FOREIGN PATENT DOCUMENTS

| | | | |
|---|---|---|---|
| JP | 05-228882 A | 9/1993 | |
| JP | 08-222871 A | 8/1996 | |
| JP | 2001-332878 A | 11/2001 | |
| JP | 2006-084725 A | 3/2006 | |
| JP | 2010-023194 A | 2/2010 | |
| JP | 2014-083623 A | 5/2014 | |

* cited by examiner

*Primary Examiner* — Justin Krause
(74) *Attorney, Agent, or Firm* — Harness, Dickey & Pierce, P.L.C.

(57) ABSTRACT

A SCARA robot according to an aspect of the invention includes a first arm rotatable with respect to a base, a second arm rotatable with respect to the first arm, a first rotation regulating member regulating a rotation of the first arm, and a second rotation regulating member regulating a rotation of the second arm. The first arm includes a beam provided inside a casing, at least one of the first rotation regulating member and the second rotation regulating member includes a contact part, a fixing part, and a connecting part.

5 Claims, 5 Drawing Sheets

SCARA ROBOT

BACKGROUND

1. Technical Field

The present invention relates to a Selective Compliance Assembly Robot Arm or Selective Compliance Articulated Robot Arm (SCARA robot).

2. Related Art

A stopper device that comes into contact with a rotary movable member of a robot when the rotary movable member is about to rotate beyond a movable range and mechanically stops the rotation has been proposed (for example, Patent Document 1 (JP-A-5-228882)).

However, in the stopper device, when the rotary movable member (arm) is in contact, shear stress is locally applied to a fixing part for fixing the stopper device and, for example, a bolt for fixing the stopper device may be broken.

SUMMARY

An advantage of some aspects of the invention is to provide a SCARA robot that may suppress breakage of a device for mechanically regulating rotation of an arm.

A SCARA robot according to an aspect of the invention includes a base, a first arm coupled to the base and being rotatable around a first axis with respect to the base, a second arm coupled to the first arm and being rotatable around a second axis apart from the first axis, a first rotation regulating member provided on the first arm and regulating a rotation of the first arm around the first axis with respect to the base, and a second rotation regulating member provided on the first arm and regulating a rotation of the second arm around the second axis, wherein the first arm includes a casing having a wall part in which hole portions penetrating in axis directions of the first axis and the second axis are formed and a beam provided inside the casing, at least one of the first rotation regulating member and the second rotation regulating member includes a contact part, a fixing part, and a connecting part that connects the contact part and the fixing part, the contact part of the first rotation regulating member is in contact with the base when the rotation of the first arm around the first axis with respect to the base is regulated, the contact part of the second rotation regulating member is in contact with the second arm when the rotation of the second arm around the second axis is regulated, the fixing part is fixed to the beam, the connecting part is inserted into the hole portion apart from an inner wall of the hole portion, and a resisting member is provided in at least one of apart between the contact part and the casing and a part between the connecting part and the inner wall of the hole portion.

According to the SCARA robot of the aspect of the invention, when the contact part of the rotation regulating member is in contact with the base or the second arm, first, bending stress is generated in the fixing part. Then, the rotation regulating member, more specifically, the connecting part is bending-deformed due to the bending stress and, when the connecting part of the rotation regulating member is in contact with the inner wall of the hole portion, shear stress is generated in the connecting part. That is, the force applied to the rotation regulating member in contact with the base or the second arm may be distributed in two locations of the rotation regulating member. Further, the resisting member is provided in at least one of the part between the contact part and the casing and the part between the connecting part and the hole portion, and thus, energy of the shear stress is relaxed by the resisting member after generation of the bending stress in the fixing part and before the rotation regulating member is bending-deformed and the connecting part comes into contact with the inner wall of the hole portion and the shear stress applied to the connecting part may be reduced. Thereby, according to the SCARA robot of the aspect of the invention, the SCARA robot that may suppress breakage of the rotation regulating member for mechanically regulating the rotation of the arm is obtained.

The second arm may include a convex portion projecting from a surface at the first arm side having a contact surface toward the first arm side, and the contact part of the second rotation regulating member may be in contact with the contact surface of the convex portion when the rotation of the second arm is suppressed.

According to the configuration, the second arm is in contact with the contact part of the second rotation regulating member on the contact surface, and a direction and a magnitude of a force applied to the second rotation regulating member may be stabilized by the second arm.

A length of the beam in the axis direction may be larger than a length of the wall part in the axis direction.

According to the configuration, a weight of the first arm may be reduced with the stronger fixation of the first rotation regulating member and the second rotation regulating member.

An elastic part may be provided in a location of the base with which the contact part is in contact.

According to the configuration, the force applied to the rotation regulating member may be further reduced.

A SCARA robot according to another aspect of the invention includes a base, a first arm coupled to the base and being rotatable around a first axis with respect to the base, a second arm coupled to the first arm and being rotatable around a second axis in parallel to the first axis and apart from the first axis with respect to the first arm, a first rotation regulating member provided on the first arm and regulating a rotation of the first arm around the first axis with respect to the base so that a rotatable range may be a predetermined range, and a second rotation regulating member provided on the first arm and regulating a rotation of the second arm around the second axis with respect to the first arm so that a rotatable range may be a predetermined range, wherein the first arm includes a casing having a wall part in which hole portions penetrating in axis directions of the first axis and the second axis are formed and a beam provided inside the casing, the second arm includes a convex portion projecting from a surface at the first arm side having a contact surface toward the first arm side, an elastic part is provided in the base, the first rotation regulating member and the second rotation regulating member each include a contact part, a fixing part, and a connecting part that connects the contact part and the fixing part, the contact part of the first rotation regulating member is in contact with the elastic part of the base when the rotation of the first arm around the first axis with respect to the base is regulated, the contact part of the second rotation regulating member is in contact with the contact surface of the convex portion of the second arm when the rotation of the second arm around the second axis with respect to the first arm is regulated, the fixing parts are fixed to the beam of the first arm, the connecting parts are inserted into the hole portions formed in the wall part of the casing apart from inner walls of the hole portions, resisting members that apply resistive forces to the first rotation regulating member and the second rotation regulating member against relative movements of the rotation regulating members with respect to the hole portions are provided between the contact parts and the casing and between the connecting parts and the inner walls of the hole portions, a length of the beam in the axis direction is larger than a length of the wall part in the axis direction, and a length of the connecting part of the first rotation regulating member in the axis direction is larger than a length of the connecting part of the second rotation regulating member in the axis direction.

According to the SCARA robot of the aspect of the invention, the breakage of the first rotation regulating member to which a larger force tends to be applied in contact than that to the second rotation regulating member may be further suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a SCARA robot according to an embodiment of the invention will be explained with reference to the drawings.

The scope of the invention is not limited to the following embodiment, but may be arbitrarily changed within the scope of the technical idea of the invention. Further, in the following drawings, for making the respective configurations understandable, scales, numbers, etc. in the respective structures may be made different from those of the actual structures.

Figure 1:
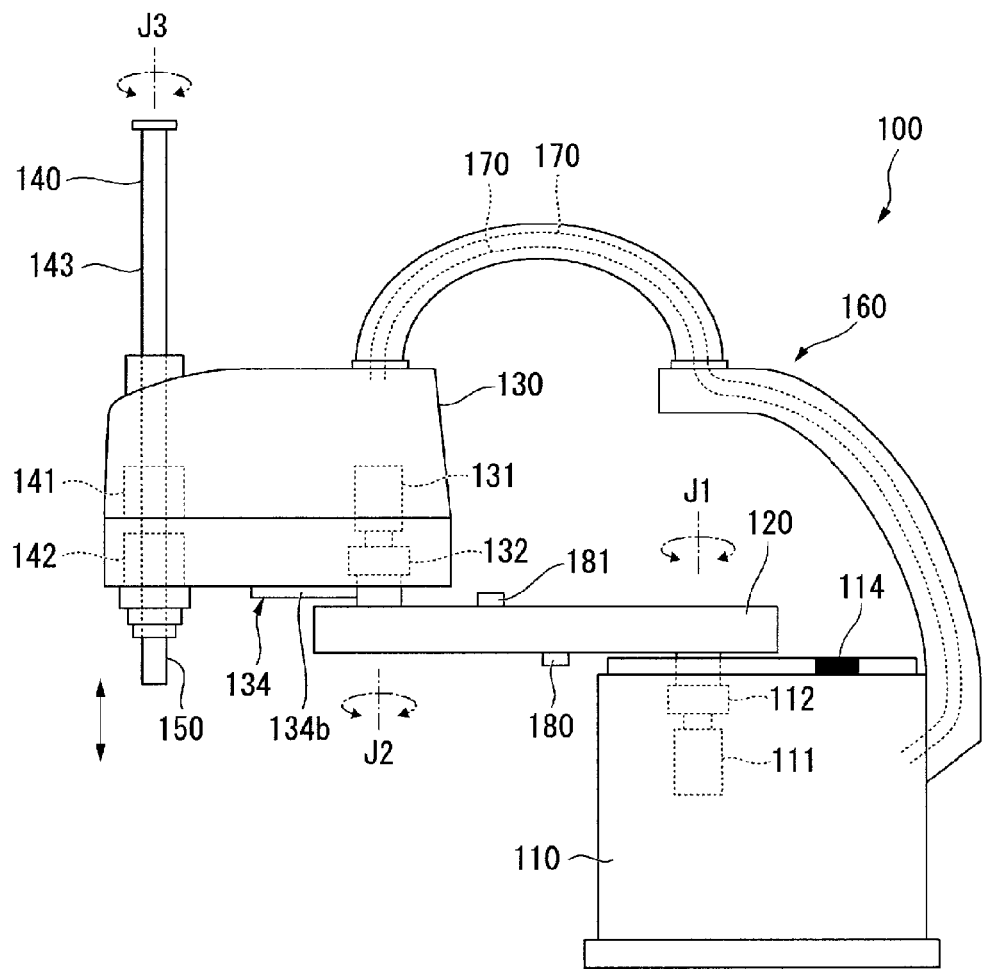
FIG. 1 is a side view showing a SCARA robot of an embodiment.
Figure 2:
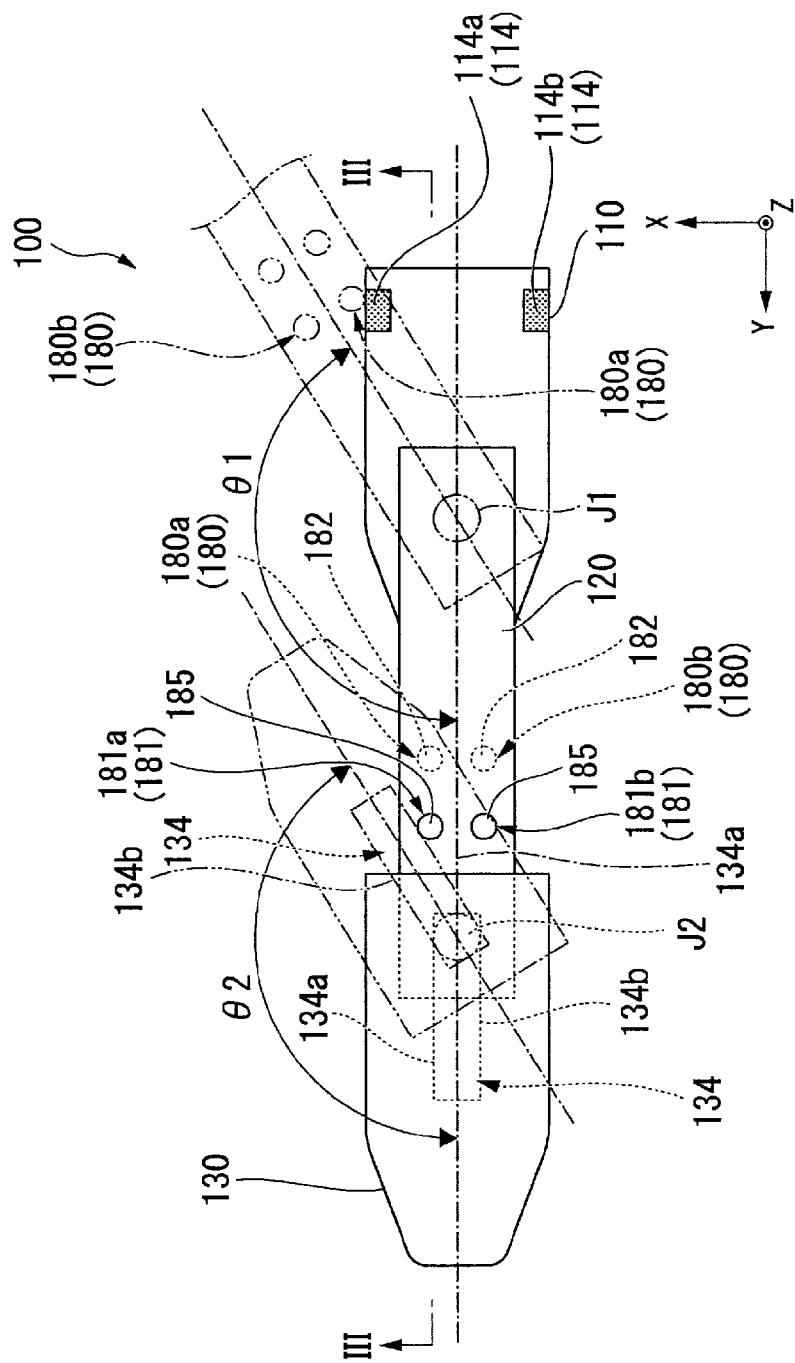
FIG. 2 is a plan view showing the SCARA robot of the embodiment.

FIGS. 1 and 2 show a SCARA (Selective Compliance Assembly Robot Arm) robot (horizontal articulated robot) 100 of the embodiment. FIG. 1 is a side view. FIG. 2 is a plan view.

In the following explanation, an XYZ coordinate system is set and a positional relationship among respective members will be explained with reference to the XYZ coordinate system. In this regard, the vertical direction is a Z-axis direction, the horizontal direction along a length direction of a base 110 (see FIGS. 1 and 2) is a Y-axis direction, and the horizontal direction along a width direction of the base 110 is an X-axis direction.

Further, in the following explanation, a position shown in FIG. 2, i.e. a position in which longitudinal directions of the base 110, a first arm 120, and a second arm 130 are aligned in a line in parallel to the Y-axis is referred to as "reference position".

As shown in FIG. 1, the SCARA robot 100 of the embodiment includes the base 110, the first arm. 120, the second arm 130, a working head 140, an end effector 150, a wire routing part 160, a first rotation regulating member 180, and a second rotation regulating member 181.

The base 110 is fixed to a floor surface (not shown) with bolts or the like, for example. The first arm 120 is coupled to an upper end part of the base 110. The first arm 120 is rotatable around a first axis J1 along the vertical direction (Z-axis direction) with respect to the base 110.

Within the base 110, a first motor 111 that rotates the first arm 120 and a first decelerator 112 are provided. An input shaft of the first decelerator 112 is coupled to a rotation shaft of the first motor 111, and an output shaft of the first decelerator 112 is coupled to the first arm 120. Accordingly, when the first motor 111 is driven and the drive force is transmitted to the first arm 120 via the first decelerator 112, the first arm 120 rotates around the first axis J1 within a horizontal plane (XY-plane) with respect to the base 110.

The base 110 includes an elastic part 114. The elastic part 114 includes a first elastic portion 114a and a second elastic portion 114b as shown in FIG. 2. The first elastic portion 114a and the second elastic portion 114b are respectively provided on both end parts (±X-side end parts) in a width direction in the upper end part (+Z-axis end part) of the base 110.

The elastic part 114 is formed using a material having elasticity. As the material having elasticity, for example, nitrile rubber (NBR: Nitril Butadiene Rubber) may be selected. The details will be described later. The elastic part 114 is a part with which a contact part 182 of the first rotation regulating member 180 is in contact when the rotation of the first arm 120 with respect to the base 110 is regulated.

Figure 3:
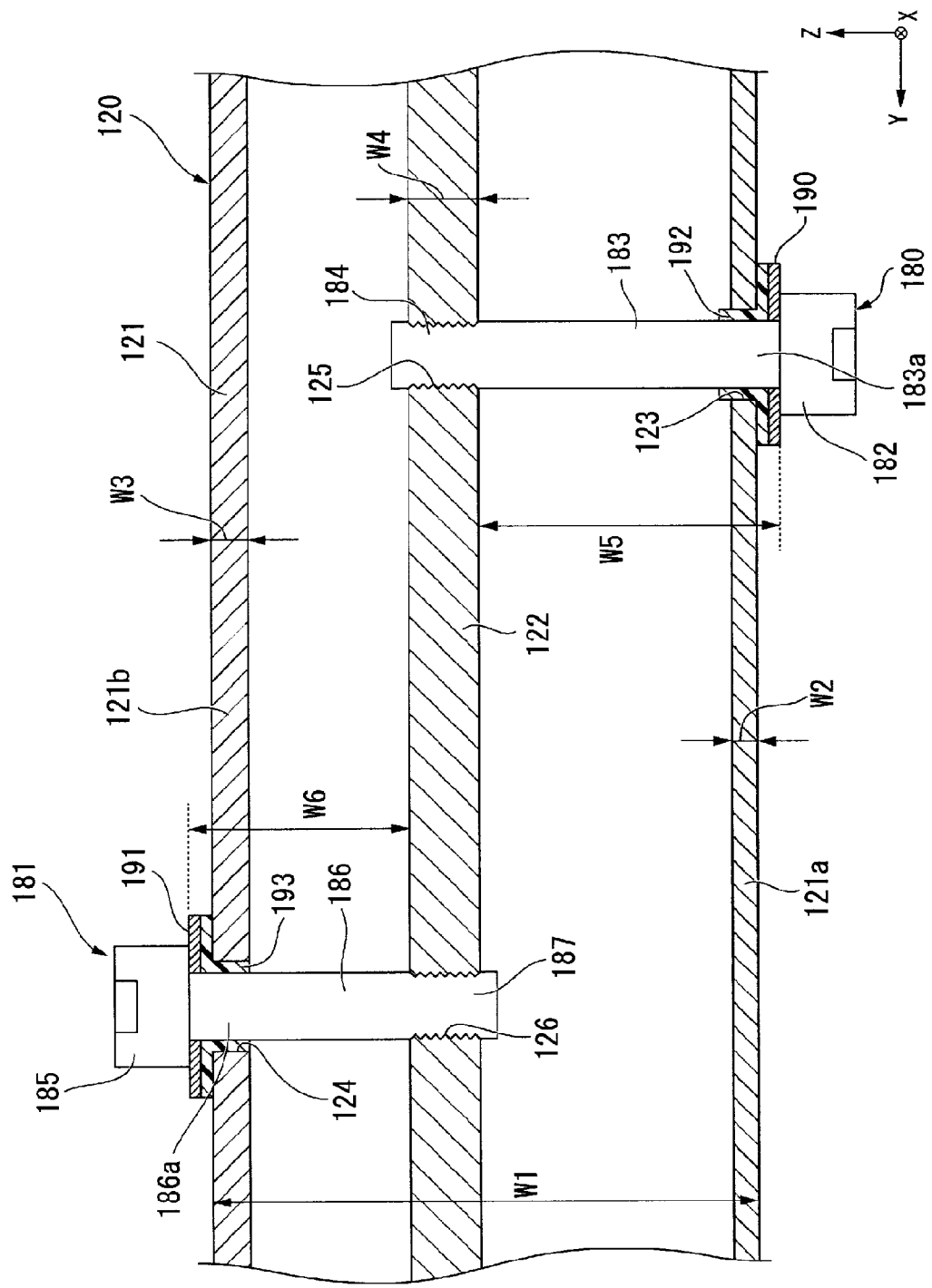
FIG. 3 is a sectional view showing a first arm of the SCARA robot of the embodiment along III-III in FIG. 2.

FIG. 3 is sectional view showing the first arm 120 along III-III in FIG. 2.

As shown in FIG. 3, the first arm 120 includes a hollow casing 121 and a beam 122 provided inside the casing 121.

Here, in the embodiment, "beam" refers to a member provided within the first arm 120 and adapted to fix the first rotation regulating member 180 and the second rotation regulating member 181 to the first arm 120 to be described later, and may have any shape within the scope.

A hole portion 123 penetrating in the vertical direction (Z-axis direction) is formed in a lower wall part (wall part) 121a at the downside in the vertical direction (−Z-side) of the casing 121. A hole portion 124 penetrating in the vertical direction (Z-axis direction) is formed in an upper wall part (wall part) 121b at the upside in the vertical direction (+Z-side) of the casing 121.

A resin member (resisting member) 192 is inserted into the hole portion 123. The resin member 192 has a tubular shape with a flange portion as a spread edge of the tubular shape in the end part at the downside in the vertical direction (−Z-side). The flange portion is in contact with the surface of the casing 121 at the downside in the vertical direction (−Z-side).

A resin member (resisting member) 193 is inserted into the hole portion 124. The resin member 193 has a tubular shape with a flange portion as a spread edge of the tubular shape in the end part at the upside in the vertical direction (+Z-side). The flange portion is in contact with the surface of the casing 121 at the upside in the vertical direction (+Z-side).

In the beam 122, an internal thread portion 125 coaxial with the hole portion 123 and an internal thread portion 126 coaxial with the hole portion 124 are formed.

A thickness W1 (the length in the Z-axis direction) of the first arm 120 is e.g., 92 mm. A thickness W2 (the length in the Z-axis direction) of the lower wall part 121a of the casing 121 is e.g., 4 mm. A thickness W3 (the length in the Z-axis direction) of the upper wall part 121b of the casing 121 is e.g., 6 mm. A thickness W4 (the length in the Z-axis direction) of the beam 122 is e.g., 12 mm.

The thickness W4 of the beam 122 is equal to lengths in the axis direction (Z-axis direction) of a fixing part 184 of the first rotation regulating member 180 and a fixing part 187 of the second rotation regulating member 181, which will be described later.

The thickness W4 of the beam 122 is larger than the thickness W2 of the lower wall part 121a and the thickness W3 of the upper wall part 121b of the casing 121.

The second arm 130 is coupled to a distal end part of the first arm 120. The second arm 130 is rotatable around a second axis J2 along the vertical direction (Z-axis direction) with respect to the first arm 120.

Within the second arm 130, a second motor 131 that rotates the second arm 130 and a second decelerator 112 are provided. An input shaft of the second decelerator 132 is coupled to a rotation shaft of the second motor 131, and an output shaft of the second decelerator 132 is coupled to the first arm 120. Accordingly, when the second motor 131 is driven and the drive force is transmitted to the first arm 120 via the second decelerator 132, the second arm 130 rotates around the second axis J2 within a horizontal plane (XY-plane) with respect to the first arm 120.

In the second arm 130, a convex portion 134 projecting from a surface at the downside in the vertical direction (−Z-side) downward in the vertical direction (toward the −Z-side) is provided. In the embodiment, the convex portion 134 has a rectangular parallelepiped shape extending in the length direction of the second arm 130 (the Y-axis direction in FIG. 1). As shown in FIG. 2, the convex portion 134 includes a contact surface 134a and a contact surface 134b coming into contact with a contact surface 185 of the second rotation regulating member 181 when the rotation of the second arm 130 is regulated. The contact surface 134a and the contact surface 134b of the convex portion 134 are surfaces perpendicularly intersecting with the horizontal plane (XY-plane).

The working head 140 is provided in a distal end part of the second arm 130. The working head 140 has a spline nut 141 and a ball screw nut 142 coaxially provided in the distal end part of the second arm 130 and a spline shaft 143 inserted into the spline nut 141 and the ball screw nut 142. The spline shaft 143 is rotatable around a third axis J3 along the vertical direction (Z-axis direction) with respect to the second arm 130 and movable upwardly and downwardly (rises and falls).

The end effector 150 is coupled to an end part (lower end part) of the spline shaft 143. The end effector 150 is not particularly limited, but includes a tool for grasping an object to be carried and a tool for machining a workpiece, for example.

A plurality of wires 170 connected to the respective electronic components (e.g., the second motor 131 etc.) provided within the second arm 130 are routed into the base 110 through the tubular wire routing part 160 that couples the second arm 130 and the base 110. Further, the plurality of wires 170 are collected within the base 110, and thereby, provided outside the base 110 with the wires connected to the first motor 111 and routed to a controller (not shown) that generally controls the SCARA robot 100.

As shown in FIGS. 1 to 3, the first rotation regulating member 180 and the second rotation regulating member 181 are provided on the first arm 120.

As shown in FIG. 2, the first rotation regulating member 180 includes a first rotation regulating member 180a and a first rotation regulating member 180b.

The first rotation regulating member 180 is a member that regulates the rotation of the first arm 120 around the first axis J1 with respect to the base 110 so that the rotatable range may be a predetermined range.

The second rotation regulating member 181 is a member that regulates the rotation of the second arm 130 around the second axis J2 with respect to the first arm 120 so that the rotatable range may be a predetermined range.

The first rotation regulating member 180 and the second rotation regulating member 181 are not particularly limited within the ranges in which the rotations of the first arm 120 and the second arm 130 may be regulated, respectively, e.g., bolts in the embodiment. The bolts used as the first rotation regulating member 180 and the second rotation regulating member 181 are e.g., M10 bolts.

As shown in FIG. 3, the first rotation regulating member 180 includes the contact part 182, a connecting part 183, and the fixing part 184. The second rotation regulating member 181 includes the contact part 185, a connecting part 186, and the fixing part 187. External threads are formed in the fixing part 184 and the fixing part 187.

Note that, in the embodiment, "contact part" refers to a part in contact with the arm to be regulated or the base in the rotation regulating member. "Fixing part" refers to a part fixed to the beam in the rotation regulating member. "Connecting part" refers to a part between the fixing part and the contact part.

The first rotation regulating member 180 is inserted into the first arm 120 from the hole portion 123 via the resin member 192 and a washer (resisting member) 190, the fixing part 184 is screwed into the internal thread portion 125, and thereby, fastened and fixed to the first arm 120. By the fastening force of the first rotation regulating member 180, the resin member 192 and the washer 190 are subject to a compression force and elastically deformed. Thereby, a normal force is generated between the resin member 192 and the washer 190 and, when a force is applied to the contact part 182, a friction force is generated between the resin member 192 and the washer 190.

The connecting part 183 is inserted into the hole portion 123 formed at the downside in the vertical direction (−Z-side) of the casing 121 apart from the inner wall of the hole portion 123. In the embodiment, the resin member 192 is provided in the hole portion 123, and the resin member 192 is provided between a contact part-side end portion 183a of the connecting part 183 located inside the hole portion 123 and the inner wall of the hole portion 123.

In the case where the rotation regulating member is the bolt as in the embodiment, the contact part 182 is a head portion of the bolt. The contact part 182 projects downward in the vertical direction (toward the −Z-side) from the surface of the casing 121. In the embodiment, the contact part 182 has a circular shape in a plan view (XY-plan view). The washer 190 and the resin member 192 are sandwiched between the contact part 182 and the surface at the downside in the vertical direction (−Z-side) of the casing 121.

The second rotation regulating member 181 is inserted into the first arm 120 from the hole portion 124 via the resin member 193 and a washer (resisting member) 191, the fixing part 187 is screwed into the internal thread portion 126, and thereby, fixed to the first arm 120.

The connecting part 186 is inserted into the hole portion 124 formed at the upside in the vertical direction (+Z-side) of the casing 121 apart from the inner wall of the hole portion 124. Like the first rotation regulating member 180, the resin member 193 is provided between a contact part-side end portion 186a of the connecting part 186 and the inner wall of the hole portion 124.

Like the contact part 182, in the embodiment, the contact part 185 is a head portion of the bolt. The contact part 185 projects upward in the vertical direction (toward the +Z-side) from the surface of the casing 121. In the embodiment, the contact part 185 has a circular shape in the plan view (XY-plan view). The washer 191 and the resin member 193 are sandwiched between the contact part 185 and the surface at the upside in the vertical direction (+Z-side) of the casing 121.

In the embodiment, a length W5 of the connecting part 183 of the first rotation regulating member 180 in the axis direction (Z-axis direction) is larger than a length W6 of the connecting part 186 of the second rotation regulating member 181 in the axis direction (Z-axis direction). The length W5 of the connecting part 183 of the first rotation regulating member 180 is e.g., 58 mm. The length W6 of the connecting part 186 of the second rotation regulating member 181 is e.g., 34 mm.

The length W5 of the connecting part 183 and the length W6 of the connecting part 186 are larger than the lengths of the fixing part 184 and the fixing part 187 in the axis direction (Z-axis direction), i.e., the thickness W4 of the beam 122.

The rotation of the first arm 120 around the first axis J1 is regulated by the first rotation regulating member 180. That is, as shown in FIG. 2, the clockwise rotation of the first arm 120 with respect to the first axis J1 in the plan view (XY-plan view) is regulated by the contact of the contact part 182 of the first rotation regulating member 180a with the first elastic portion 114a of the base 110. The counterclockwise rotation of the first arm 120 with respect to the first axis J1 in the plan view (XY-plan view) is regulated by the contact of the contact part 182 of the first rotation regulating member 180b with the second elastic portion 114b of the base 110.

Thereby, the rotatable range of the first arm 120 is regulated to be a range of an angle around the first axis J1±θ1 with respect to the reference position. The angle θ1 is e.g., 150°.

The rotation of the second arm 130 around the second axis J2 is regulated by the second rotation regulating member 181. That is, the clockwise rotation of the second arm 130 with respect to the second axis J2 in the plan view is regulated by the contact of the contact surface 134a of the second arm 130 with the contact part 185 of a second rotation regulating member 181a. The counterclockwise rotation of the second arm 130 with respect to the second axis J2 in the plane view is regulated by the contact of the contact surface 134b of the second arm 130 with the contact part 185 of a second rotation regulating member 181b.

Thereby, the rotatable range of the second arm 130 is regulated to be a range of an angle around the second axis J2±θ2 with respect to the reference position. The angle 82 is e.g., 130°.

According to the embodiment, the SCARA robot that may suppress breakage of the first rotation regulating member 180 and the second rotation regulating member 181 for mechanically regulating the rotations of the first arm 120 and the second arm 130 is obtained. As below, the detailed explanation will be made.

Figure 5:
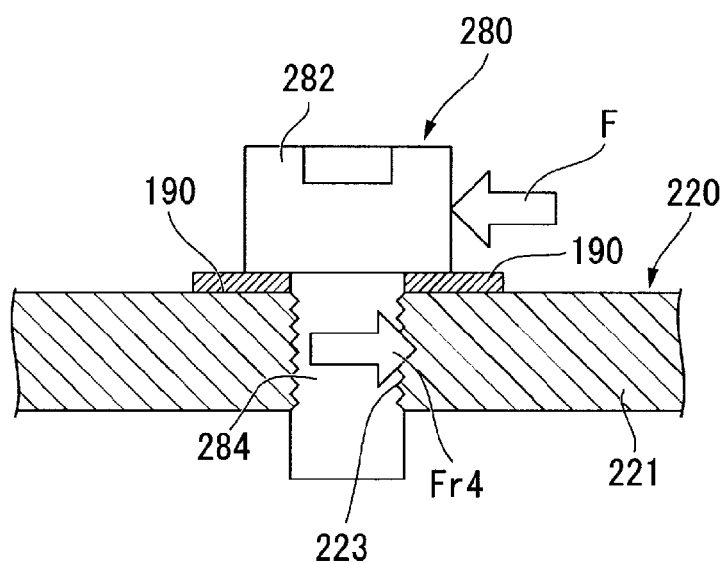
FIG. 5 is a sectional view for explanation of forces applied to a rotation regulating member.

FIG. 5 is a sectional view for explanation of forces applied to a rotation regulating member in the case where the rotation regulating member is fixed directly to a casing of an arm.

An arm 220 shown in FIG. 5 includes a casing 221. An internal thread 223 is formed in the casing 221 and a fixing part 284 of a rotation regulating member 280 is screwed and fixed thereto.

When a second arm or a base comes into contact with a contact part 282 of the rotation regulating member 280 and a force F is applied thereto, a reaction force Fr4 is generated in the fixing part 284 as a part fixed to the casing 221. As a result, shear stress is concentrated on the fixing part 284 of the rotation regulating member 280, and thereby, the rotation regulating member 280 may be broken.

On the other hand, according to the embodiment, the force F applied to the first rotation regulating member 180 and the second rotation regulating member 181 may be distributed and received in two locations.

Figure 4:
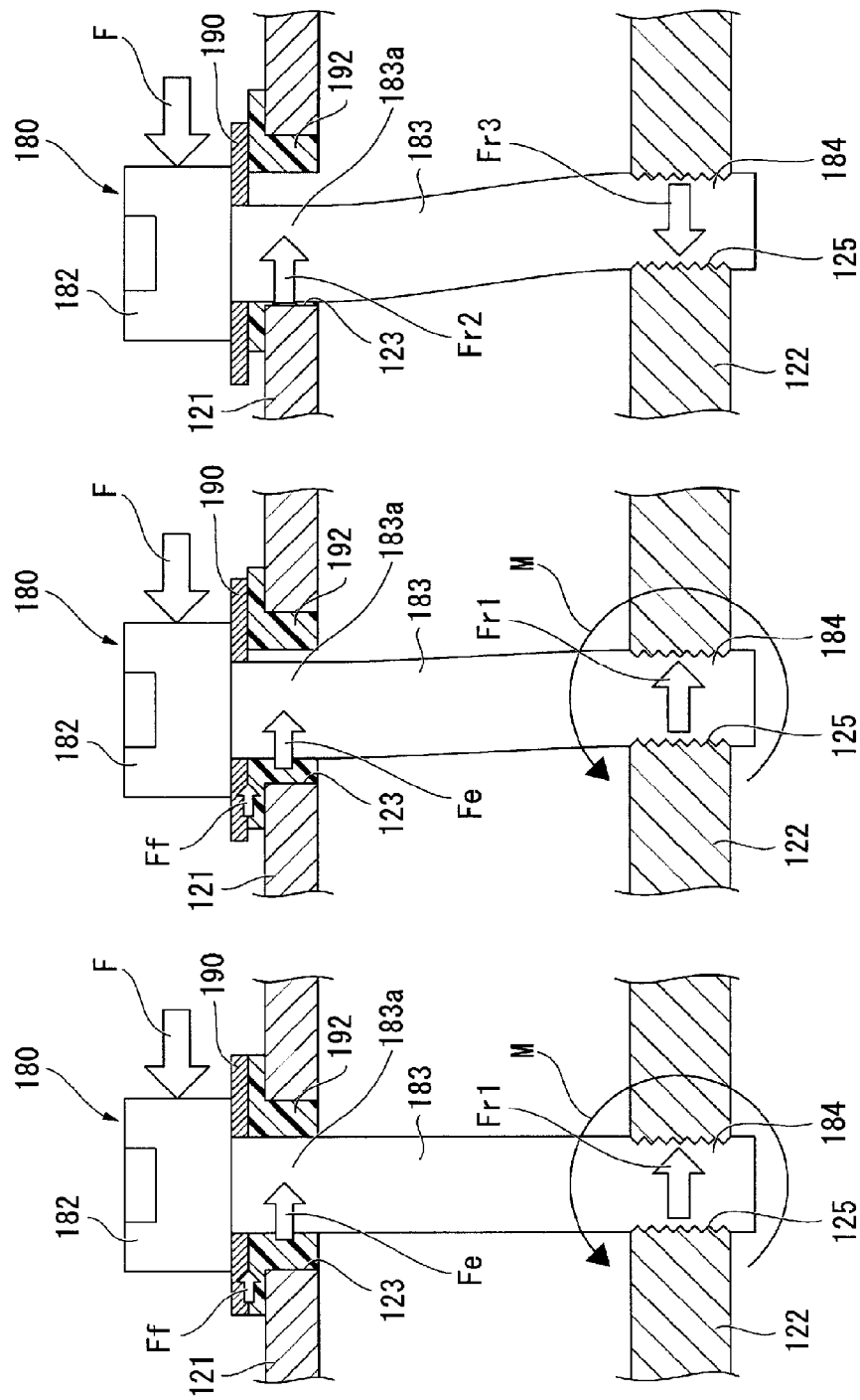
FIGS. 4A to 4C are sectional views for explanation of forces applied to a rotation regulating member.

FIGS. 4A to 4C are sectional views for explanation of forces applied to the first rotation regulating member 180. In the following explanation, the first rotation regulating member 180 will be representatively explained using FIGS. 4A to 4C, however, the same applies to the second rotation regulating member 181.

First, as shown in FIG. 4A, when the base 110 comes into contact with the contact part 182 and a force F is applied thereto, a reaction force Fr1 opposite to the force F is generated in the fixing part 184 fixed to the beam 122. Thereby, counterclockwise bending moment M in the drawing is generated.

Further, the normal force is generated between the washer 190 and the resin member 192 by the fastening force of the first rotation regulating member 180 as described above, and thereby, a friction force (resistive force) Ff opposite to the force F is generated. An elastic force (resistive force) Fe opposite to the force F is applied to the connecting part 183 from the resin member 192 in the contact part-side end portion 183a inserted into the hole portion 123.

As shown in FIG. 4B, the connecting part 183 is bent by the bending moment M, and the contact part-side end portion 183a in the connecting part 183 comes closer to the inner wall of the hole portion 123.

Then, as shown in FIG. 4C, when the connecting part 183 comes into contact with the inner wall of the hole portion 123, a reaction force Fr2 opposite to the force F is generated in the connecting part 183, and a reaction force Fr3 in the same direction as that of the force F is generated in the fixing part 184 in the beam 122. By the force F and the reaction force Fr2, shear stress is generated in the contact part-side end portion 183a of the connecting part 183.

Note that, in the embodiment, the resin member 192 is provided between the connecting part 183 and the inner wall of the hole portion 123, and thus, the connecting part 183 and the inner wall of the hole portion 123 are not brought into direct contact, but in contact via the resin member 192. In this case, the resin member 192 is not further elastically deformed.

As described above, according to the embodiment, the reaction force Fr1 is generated in the fixing part 184 fixed to the beam 122 immediately after the application of the force F to the contact part 182. Then, when the contact part-side end portion 183a of the connecting part 183 comes into contact with the inner wall of the hole portion 123, i.e., the casing 121, the reaction force Fr2 is generated in the contact part-side end portion 183a of the connecting part 183. Accordingly, the force F applied to the contact part 182 may be received in two locations of the fixing part 184 and the contact part-side end portion 183a of the connecting part 183.

Further, the friction force Ff and the elastic force Fe opposite to the force F are generated by the washer 190 and the resin member 192 until the contact part-side end portion 183a of the connecting part 183 comes into contact with the inner wall of the hole portion 123. Thereby, energy due to contact may be reduced and the shear stress generated when the contact part-side end portion 183a of the connecting part 183 is in contact with the inner wall of the hole portion 123 may be relaxed.

As described above, according to the embodiment, local application of the force F applied to the first rotation regulating member 180 may be suppressed and the shear stress generated in the connecting part 183 may be relaxed, and thereby, the SCARA robot that may suppress breakage of the first rotation regulating member 180 may be obtained.

Further, according to the embodiment, the first rotation regulating member 180 and the second rotation regulating member 181 provided on the first arm 120 receive the distributed force F as described above, and thereby, the rotations of the first arm 120 and the second arm 130 may be regulated. Accordingly, breakage of the base 110 and the second arm 130 may be suppressed. That is, even when the rotations of the first arm 120 and the second arm 130 are mechanically regulated by the first rotation regulating member 180 and the second rotation regulating member 181, time and effort of replacement due to the breakage of the base 110 and the second arm 130 on which the motors and the decelerators are mounted may be reduced.

Furthermore, according to the embodiment, the thickness W4 of the beam 122 is larger than the thickness W2 of the lower wall part 121a and the thickness W3 of the upper wall part 121a, and thus, the weight of the whole first arm 120 may be reduced with the stronger fixation of the first rotation regulating member 180 and the second rotation regulating member 181 to the beam 122.

Further, according to the embodiment, the contact parts 185 of the second rotation regulating member 181 come into contact with the contact surface 134a and the contact surface 134b of the convex portion 134 provided on the second arm 130. Accordingly, the direction and the magnitude of the force applied to the second rotation regulating member 181 may be stabilized by the second arm 130.

Furthermore, according to the embodiment, the length W5 of the connecting part 183 of the first rotation regulating member 180 is set to be larger than the length W6 of the connecting part 186 of the second rotation regulating member 181. Accordingly, compared to the second rotation regulating member 181, a distance from the contact part 182 to the fixing part 184 to which the force F is applied is longer in the first rotation regulating member 180. As a result, the moment arm is larger and the bending moment M generated by the force F is larger. Therefore, the energy by the force F applied to the first rotation regulating member 180 may be relaxed by the bending of the connecting part 183, and the shear stress generated when the contact part-side end portion 183a of the connecting part 183 is in contact with the casing 121 may be further reduced.

The force F applied to the second rotation regulating member 181 in the case where the rotation of the second arm 130 with respect to the first arm 120 is regulated is determined by the weight and the rotation speed of the second arm 130. On the other hand, the force F applied to the first rotation regulating member 180 in the case where the rotation of the first arm 120 with respect to the base 110 is regulated is determined by the weights of the first arm 120 and the second arm 130 and their rotation speeds. Accordingly, the force F applied to the first rotation regulating member 180 is larger than the force F applied to the second rotation regulating member 181 inmost cases. Therefore, using the above described configuration, according to the embodiment, the breakage of the first rotation regulating member 180 and the second rotation regulating member 181 may be suppressed more efficiently with suppression of increase in the thickness W1 of the first arm 120.

Further, in the embodiment, the elastic part 114 is provided in the part with which the first rotation regulating member 180 is in contact in the base 110, and thereby, the force F applied to the first rotation regulating member 180 when the base 110 and the first rotation regulating member 180 come into contact may be reduced.

Incidentally, in the embodiment, the following configurations may be employed.

In the embodiment, one of the first rotation regulating member 180 and the second rotation regulating member 181 may have a different configuration from the configuration of the rotation regulating member of the embodiment. That is, one of the first rotation regulating member 180 and the second rotation regulating member 181 may have a configuration like that of the rotation regulating member 280 shown in FIG. 5, for example.

Further, in the embodiment, the washers 190, 191 may be in direct contact with the surfaces of the casing 121. In this case, the resin members 192, 193 may not necessarily be provided or provided only between the connecting parts 183, 186 and the hole portions 123, 124.

Furthermore, in the embodiment, the washers 190, 191 may not necessarily be provided.

Further, in the embodiment, the resin members 192, 193 may be provided only between the washers 190, 191 and the surfaces of the casing 121, or provided only between the connecting parts 183, 186 and the hole portions 123, 124.

In the case where the resin members 192, 193 are not provided between the connecting parts 183, 186 and the hole portions 123, 124, when the rotations of the first arm 120 and the second arm 130 are regulated, the connecting parts 183, 186 come into direct contact with the inner walls of the hole portions 123, 124.

Further, in the above described embodiment, the washers 190, 191 and the resin members 192, 193 are used as resisting members, however, not limited to those. The resisting member is not particularly limited within a range of a member that may provide a resistive force for suppressing relative movement of the contact part-side end portion 183a of the connecting part 183 with respect to the hole portion 123 to the first rotation regulating member 180. For example, a member to elastically deform or a member to plastically deform may be employed.

Furthermore, in the above described embodiment, the contact part 182 of the first rotation regulating member 180 is in contact with the elastic part 114 of the base 110, however, not limited to that. In the embodiment, for example, the base 110 may include another member directly fixed to the base 110, e.g., a bolt or the like and the contact part 182 of the first rotation regulating member 180 may be in contact with the fixed other member.

In the embodiment, the elastic part 114 of the base 110 may not necessarily be provided.

In addition, in the above described embodiment, the contact part 185 of the second rotation regulating member 181 is in contact with the convex portion 134 provided on the second arm 130, however, not limited to that. In the embodiment, for example, in place of the convex portion 134, a bolt may be directly fixed to the second arm 130 and the contact part 185 of the second rotation regulating member 181 may be in contact with the head portion of the bolt.

The entire disclosure of Japanese Patent Application No. 2013-223013, filed Oct. 28, 2013 is expressly incorporated by reference herein.

What is claimed is:

1. A SCARA robot comprising:
a base;
a first arm coupled to the base and being rotatable around a first axis with respect to the base;
a second arm coupled to the first arm and being rotatable around a second axis apart from the first axis;
a first rotation regulating member provided on the first arm and regulating a rotation of the first arm around the first axis with respect to the base; and
a second rotation regulating member provided on the first arm and regulating a rotation of the second arm around the second axis, wherein the first arm includes a casing having a wall part in which hole portions penetrating in axis directions of the first axis and the second axis and a beam provided inside the casing, at least one of the first rotation regulating member and the second rotation regulating member includes a contact part, a fixing part, and a connecting part that connects the contact part and the fixing part, the contact part of the first rotation regulating member is in contact with the base when the rotation of the first arm around the first axis with respect to the base is regulated, the contact part of the second rotation regulating member is in contact with the second arm when the rotation of the second arm around the second axis is regulated, the fixing part is fixed to the beam, the connecting part is inserted into the hole portion apart from an inner wall of the hole portion, and a resisting member is provided in at least one of a part between the contact part and the casing and a part between the connecting part and the inner wall of the hole portion.

2. The SCARA robot according to claim 1, wherein the second arm includes a convex portion projecting from a surface at the first arm side having a contact surface toward the first arm side, and the contact part of the second rotation regulating member is in contact with the contact surface of the convex portion when the rotation of the second arm is suppressed.

3. The SCARA robot according to claim 1, wherein a length of the beam in the axis direction is larger than a length of the wall part in the axis direction.

4. The SCARA robot according to claim 1, wherein an elastic part is provided in a location of the base with which the contact part is in contact.

5. A SCARA robot comprising:
   a base;
   a first arm coupled to the base and being rotatable around a first axis with respect to the base;
   a second arm coupled to the first arm and being rotatable around a second axis in parallel to the first axis and apart from the first axis with respect to the first arm;
   a first rotation regulating member provided on the first arm and regulating a rotation of the first arm around the first axis with respect to the base so that a rotatable range may be a predetermined range; and
   a second rotation regulating member provided on the first arm and regulating a rotation of the second arm around the second axis with respect to the first arm so that a rotatable range may be a predetermined range, wherein the first arm includes a casing having a wall part in which hole portions penetrating in axis directions of the first axis and the second axis and a beam provided inside the casing, the second arm includes a convex portion projecting from a surface at the first arm side having a contact surface toward the first arm side, an elastic part is provided in the base, the first rotation regulating member and the second rotation regulating member each include a contact part, a fixing part, and a connecting part that connects the contact part and the fixing part, the contact part of the first rotation regulating member is in contact with the elastic part of the base when the rotation of the first arm around the first axis with respect to the base is regulated, the contact part of the second rotation regulating member is in contact with the contact surface of the convex portion of the second arm when the rotation of the second arm around the second axis with respect to the first arm is regulated, the fixing parts are fixed to the beam of the first arm, the connecting parts are inserted into the hole portions formed in the wall part of the casing apart from inner walls of the hole portions, resisting members that apply resistive forces to the first rotation regulating member and the second rotation regulating member against relative movements of the rotation regulating members with respect to the hole portions are provided between the contact parts and the casing and between the connecting parts and the inner walls of the hole portions, a length of the beam in the axis direction is larger than a length of the wall part in the axis direction, and a length of the connecting part of the first rotation regulating member in the axis direction is larger than a length of the connecting part of the second rotation regulating member in the axis direction.

* * * * *